Figure 1:
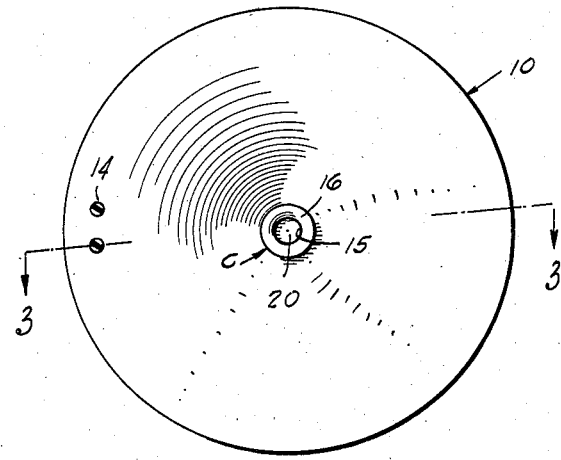

March 7, 1939.  C. WHITTICAR  2,149,652

HEAD MIRROR

Filed Feb. 9, 1938

INVENTOR.
Curtis Whitticar
BY Joshua H. Potts
ATTORNEY.

Patented Mar. 7, 1939

2,149,652

UNITED STATES PATENT OFFICE 2,149,652

HEAD MIRROR

Curtis Whitticar, Philadelphia, Pa.

Application February 9, 1938, Serial No. 189,473

5 Claims. (Cl. 128—21)

This invention has to do with head mirrors such as are commonly employed by members of the medical profession for the purpose of throwing a beam of light into a desired zone of examination.

At the present time head mirrors of the type with which this invention is concerned ordinarily include as characteristic elements a concave reflecting member having a reflecting surface of appropriate curvature, and which reflecting member is formed with a central opening. Adjacent to the peripheral edge of the mirror there is provided means for securing the same to a headband. Ofttimes occasions arise when it is necessary or desirable for the user of the mirror to have the advantages of magnified vision, and there has been proposed an arrangement for associating a magnifying lens with the central opening.

However, the now-known arrangement for associating a magnifying lens or lenses with these head mirrors is highly complex in nature, and affords a complicated and cumbersome assembly.

Accordingly this invention has in view as its foremost objective the provision of a head mirror of the type above described together with highly simplified means for assembling a lens with the mirror at the central opening therein.

In attaining this objective the invention has in view the use of a connecting member which is made from an appropriate flexible material such as a suitable rubber composition, and which is structurally designed to provide a groove for receiving the edge of the opening in the mirror. The connecting member is also formed with a second groove on the back or convex side of the mirror, and which is defined by an outer flange that may be deformed and displaced out of its normal position to permit of the insertion of a lens. When the lens has been positioned the flange will resume its normal shape and maintain the lens assembled in the connecting member.

An important phase of the present invention is associated with the particular material employed in the manufacture of the connecting member as well as the dimensions of the several walls and flanges thereof, so as to insure of proper manipulation that is necessary to the position of the connecting member in the mirror and the assembly of the lens therewith. These somewhat detailed features, as well as other objects and advantages, will in part become apparent and in part be hereinafter stated, as the description of the invention proceeds.

The invention, therefore, comprises a head mirror which takes the form of a concave reflecting element having a central opening and provided with means for attaching the same to a headband. Associated with the mirror at the central opening is a connecting member formed with a groove for receiving the edge of the opening. This connecting member also is formed with a wall and flange structure on the outer or convex side of the mirror which is adapted to receive and maintain assembled a lens. The material of the connecting member, as well as the dimensions of the wall and flange structures thereof, are important features of the invention as they insure of proper manipulation of the several parts for assembly purposes.

Figure 2:
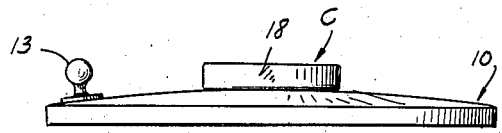
Figure 3:
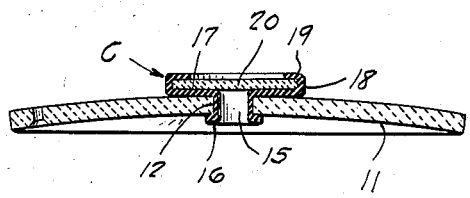

For a full and more complete understanding of the invention reference may be had to the following description and accompanying drawing, wherein Figure 1 is a plan view of a head mirror made in accordance with the precepts of this invention. This view is taken looking at the concave side of the mirror, Figure 2 is a side elevational showing of the mirror shown in Figure 1, and Figure 3 is a section taken about on the plane represented by the line 3—3 of Figure 1.

Referring now to the drawing, wherein like reference characters denote corresponding parts, a reflecting element is shown at 10 as having a reflecting surface 11 which is concave and which may be of any desired curvature. This reflecting element should be of a fairly rigid material, silvered glass being a preferred embodiment. However, the conventional practice in this art dictates that the curvature of the concave reflecting surface 11 be about 1½ diopters. Centrally of the reflecting element there is formed an opening 12, and adjacent to the peripheral edge of the deflecting member 10, and preferably on the outside or convex face thereof is anchored a ball connecting member 13, as by the fastening elements shown at 14, and which ball connecting member serves as a means for adjustably securing the reflecting element to a headband (not illustrated).

The particular manner of securing the mirror to a headband by the ball element 13 to provide a universal point is well-known in this art, and need not be here illustrated and described.

While the present invention is capable of being used with mirrors of any curvature and size, the present invention has been designed with the conventional type head mirror particularly in mind. Such mirrors as ordinarily are manufactured have a diametrical dimension of 88 millimeters, while the opening at 12 has a diameter of 8 millimeters. The connecting member to be hereinafter described is designed for assembly with a head mirror of the above noted dimensions.

A connecting member is referred to in its entirety by the reference character C, and is preferably made from a rubber compound which characteristically includes 76% by weight of that rubber which is known in the trade as new pure Pará rubber. While there may be other materials or compositions which will have the desired properties of flexibility, elasticity and rigidity to perform the required holding functions, a rubber composition of the type above indicated when used in a connecting member of the dimensions hereinafter set forth will provide the desired results.

The connecting member C is formed with a sleeve 15 which extends through the opening 12. The wall of this sleeve 15 preferably is 1 millimeter in thickness, while the outer dimension of the sleeve itself is 4 millimeters in length to accommodate the thickness of the reflecting element 10. On the inner or concave side of the reflecting element 10 the sleeve 15 terminates in a flange 16 that is 1½ millimeters in thickness, and 2 millimeters across.

On the outer or convex side of the reflecting element 10 the sleeve 15 is integrally connected with a wall 17 that is substantially flat, and which engages the outer face of the reflecting element 10. This wall 17 is 1½ millimeters thick and has an outer diametrical dimension of 28 millimeters.

Integrally connected to the wall 17 at its peripheral edge is a cylindrical wall 18 that is also 1½ millimeters in thickness, and an outer flange 19 is in turn integrally connected to this wall 18. This flange 19 is also 1½ millimeters in thickness, and is 4 millimeters across.

It is noted that the wall 17 and flange 16 define a groove which snugly receives the edge of the opening 12 in the reflecting element 10. The opposite face of the wall 17 and the inner face of the flange 19 define another groove which receives a lens designated 20. It is evident that in order for the connecting member C to be assembled in the opening 12 of the reflecting element 10 it is essential that the wall 15 and flange 16 be deformed so that it may be properly inserted. When the deforming pressure is relieved the connecting member will assume the position illustrated in Figure 3.

Likewise when the lens 20 is to be assembled in the connecting member C the flange 19 must be curled back to permit of the insertion. However, the normal elasticity of the rubber will cause the connecting member to assume and maintain the position shown in Figure 3, in which the lens is properly assembled with the reflecting element.

While a preferred specific embodiment of the invention is hereinbefore set forth it is to be clearly understood that I am not to be limited to the exact construction illustrated and described, because various modifications of these details may be provided in putting the invention into practice within the purview of the appended claims.

I claim:

1. In combination, a head mirror formed with a central opening, a connecting member made from a flexible and elastic material formed with a groove receiving the edge of said mirror about said opening, said connecting member also being formed with structure disposed exteriorly of the mirror and defining a second groove, and a lens in said second groove.

2. In combination, a head mirror which consists of a concave reflecting element formed with a central opening, a connecting member made from a flexible and elastic material and having a sleeve snugly engaging said opening in the mirror, one end of said sleeve being formed with a flange that engages the concave face of the reflecting element about said opening, the other end of said sleeve being formed with a wall that engages the convex face of the reflecting element, a cylindrical wall integrally connected to said first mentioned wall, and a flange integrally connected to said cylindrical wall, said flange, cylindrical wall and first mentioned wall defining a groove, and a lens detachably secured in said groove.

3. In combination, a head mirror which consists of a concave reflecting element formed with a central opening, a rubber connecting member having a sleeve snugly engaging said opening in the mirror, one end of said sleeve being formed with a flange that engages the concave face of the reflecting element about said opening, the other end of said sleeve being formed with a wall that engages the convex face of the reflecting element, a cylindrical wall integrally connected to said first mentioned wall, and a flange integrally connected to said cylindrical wall, said flange, cylindrical wall and first mentioned wall defining a groove, and a lens detachably secured in said groove.

4. A connecting member designed for use in assembling a lens with a head mirror having a central opening, said connecting member consisting of a body structure made from a flexible and elastic material and comprising a sleeve formed with a flange at one end and a wall at the other end, said wall, flange and sleeve defining a groove which is adapted to snugly receive the edge of the head mirror about the said opening therein, a flange spaced from said end wall and connected thereto by a cylindrical wall, said flange, cylindrical wall and end wall defining a second groove which is adapted to receive a lens.

5. A connecting member designed for use in assembling a lens with a head mirror having a central opening consisting of a sleeve-like member having an opening extending therethrough and formed from a flexible and elastic composition, said member having a pair of oppositely opening grooves, one of said grooves being adapted to receive the edge of said mirror about said opening while the other of said grooves is adapted to receive a lens, the wall structure about each of said grooves being deformable to permit of the assembly of the mirror and lens structure therewith.

CURTIS WHITTICAR.